June 6, 1939.  K. RANDALL ET AL  2,161,314

SWITCH AND SIGNAL MECHANISM FOR TRACKS AND VEHICLE TOYS

Filed Sept. 24, 1936   3 Sheets-Sheet 1

INVENTORS
KING RANDALL
and MYRON FLEISHMAN
BY
ATTORNEYS

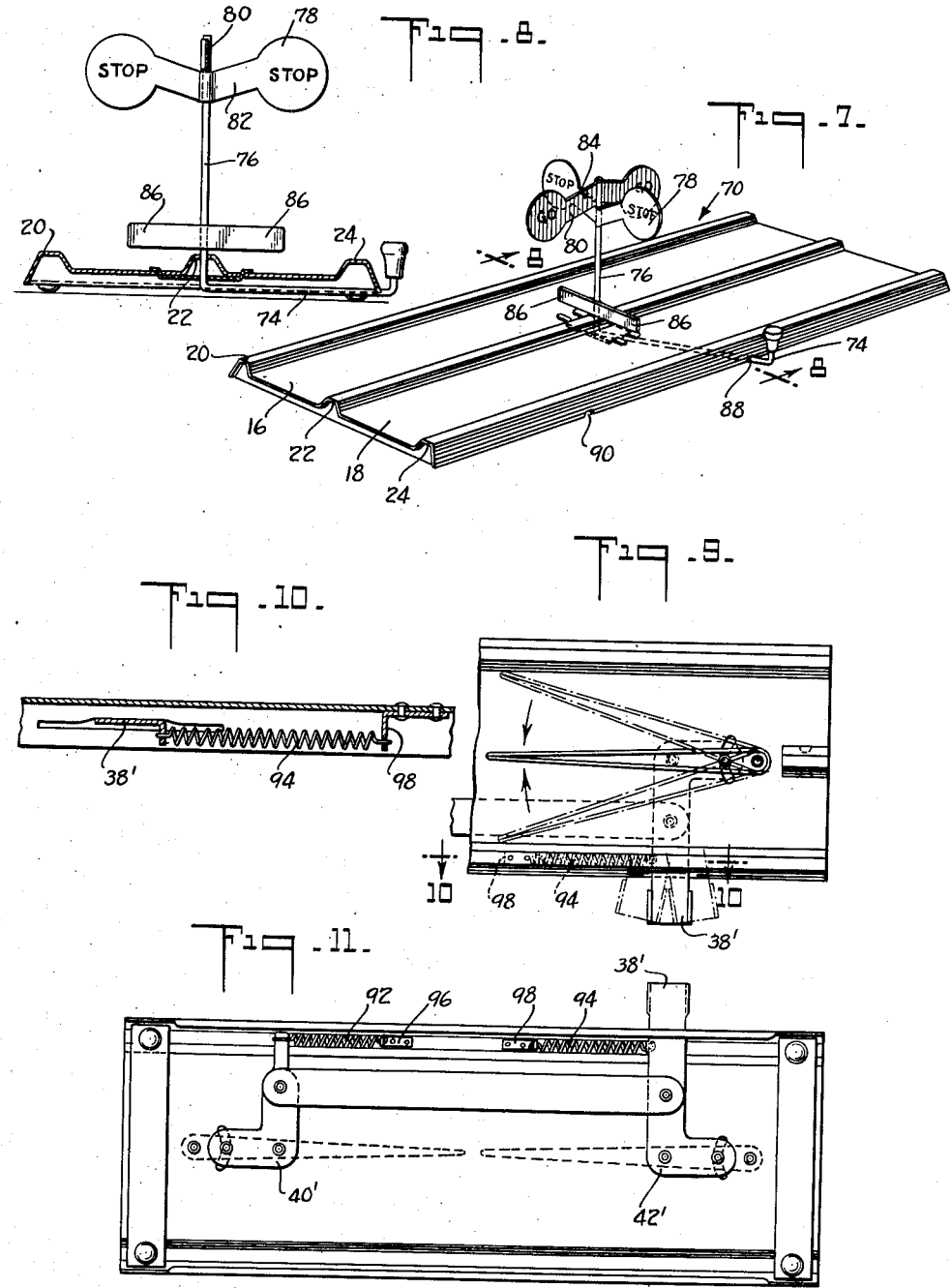

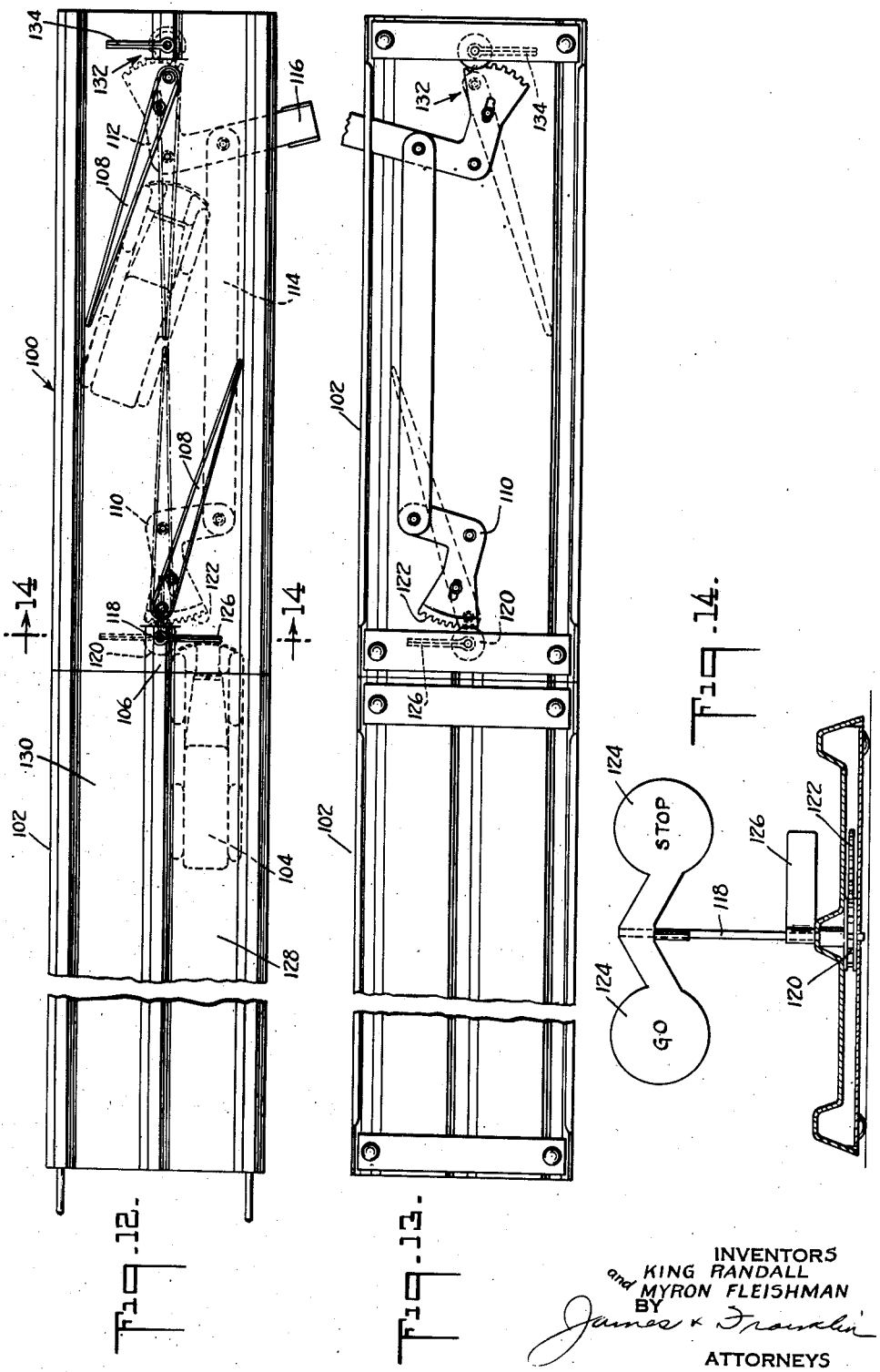

Patented June 6, 1939

2,161,314

UNITED STATES PATENT OFFICE 2,161,314

SWITCH AND SIGNAL MECHANISM FOR TRACKS AND VEHICLE TOYS

King Randall and Myron Fleishman, Erie, Pa., assignors to Louis Marx & Company, Inc., New York, N. Y., a corporation of New York Application September 24, 1936, Serial No. 102,268

18 Claims. (Cl. 104—60)

This invention relates to toys, and more particularly to a toy including closed trough-like tracks simulating a road or race track with toy vehicles thereon.

A toy of known manufacture comprises a plurality of road sections which may be joined end to end to form a plurality of closed tracks. Most commonly, these tracks extend side by side throughout their length, but they need not necessarily do so. The present invention may be applied to a part of the road in which the vehicles run side by side even though the individual tracks separate from one another at other points in the circuit. The track is dished or trough-shaped or sidewardly flanged in order to guide one or more vehicle toys, the said toys preferably being self-propelled by a spring motor or the like, and simulating racing automobiles or other vehicles.

One object of the present invention resides in the provision of switch means for transferring a vehicle running on one of the tracks to the other track; for example, a vehicle running on the inside track may be transferred to the outside track, and conversely, a vehicle running on the outside track may be transferred to the inside track, this transfer in either direction being made by means of a single switch mechanism. A more particularized object is to provide switch mechanism which will function as above described, regardless of whether the vehicles approach the switch from one direction or the other, that is, regardless of whether the vehicles run clockwise or counter-clockwise around the roadway.

Still another object is to provide signal and stop mechanism for the roadway and to so interconnect the same as to automatically stop a vehicle approaching a stop signal. Still another object is to suitably interconnect the switch mechanism and the signal mechanism so as to simultaneously operate the same by a single control device.

To the accomplishment of the foregoing and other objects which will hereinafter appear, our invention consists in the switch and signal elements for a toy road, and their relation one to the other, as hereinafter are more particularly described in the specification and sought to be defined in the claims. The specification is accompanied by drawings in which:

Fig. 7 is a perspective view of the section having the stop signal mechanism;

Fig. 8 is a section taken in the plane of the line 8—8 of Fig. 7;

Fig. 9 is a plan view showing switch mechanism modified for automatic return to mid-position;

Fig. 10 is a section taken in the plane of the line 10—10 of Fig. 9;

Fig. 11 is an inverted plan view of the modified switch section;

Fig. 12 is a plan view of a switch section provided with combined switch and stop mechanism;

Fig. 13 is an inverted plan view of said mechanism; and

Fig. 14 is a transverse section taken in the plane of the line 14—14 of Fig. 12.

Figure 1:
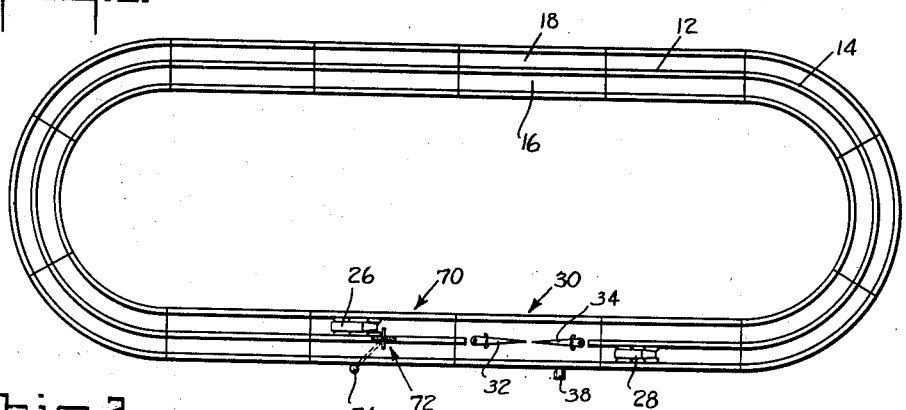
Fig. 1 is a plan view of a simple elliptical double-track road provided with separate or independently operable switch and signal mechanisms.

Referring to the drawings and more particularly to Fig. 1, a toy road is made up of a plurality of straight and curved sections 12 and 14 detachably connected end to end to form a closed circuit which in the present case is merely elliptical in form, but, of course, more elaborate road layouts may be employed. The road is a two-track road, there being an inside track 16 and an outside track 18. The nature of the tracks will be readily understood by reference to the perspective showing in Fig. 7, in which it will be seen that each track is downwardly depressed or trough-shaped, or, differently expressed, each track is provided with marginal guides or flanges 20, 22, and 24 which function to guide a vehicle in the track. Reverting to Fig. 1, vehicles are indicated at 26 and 28, these vehicles preferably being miniature toy vehicles simulating automobiles and provided with wheels the tread or gauge of which is less than the spacing between the marginal flanges of the track. Vehicle 26 is shown running on the inside track and vehicle 28 on the outside track; and with these toys as heretofore constructed it was necessary for the vehicles to remain in their respective tracks.

In accordance with the present invention, the roadway is provided with switch mechanism generally indicated at 30. For convenience, the switch mechanism is built upon a single road section. Referring now to Figs. 2 through 6, the road section 30 differs from the remaining road sections in that the center ridge or partition 22 separating the inside track 16 from the outside track 18 is interrupted or eliminated, so that the bottom of track 16 is continuous with the bottom of track 18. In place of the eliminated partition 22, we provide switch tongues 32 and 34 which are disposed end to end in alignment with the center partition 22. It will be noted that the points of tongues 32 and 34 are directed toward one another, and that the tongues are movably mounted about pivots 36 at the remote ends of the tongues. The switch is operated by a control handle 38 projecting from one side of the switch section; and by manipulation of handle 38, the tongues 32 and 34 may be swung sidewardly away from mid-position to an angular position, as is indicated in Fig. 3. It is important to note that the mechanism interconnecting the operating handle 38 and the switch tongues is so designed that tongue 32 is swung outwardly when tongue 34 is swung inwardly, and vice versa. The tongues are thus brought into position to guide a vehicle from the inside track to the outside track, as is clearly shown in Fig. 3. It will be understood that by swinging the tongues in opposite direction a vehicle will be guided from the outside track to the inside track.

The linkage controlling the movement of the switch tongues includes a pair of angle levers 40 and 42 which are pivotally mounted beneath the switch section. The longitudinally directed arms 44 and 46 of the angle levers are pointed in opposite directions, while the transversely directed arms 48 and 50 of the angle levers are directed in a common direction. The transverse arms 48 and 50 are connected by a suitable link 51. The outer ends of the longitudinally directed arms 44 and 46 are connected to the respectively superposed switch tongues. More specifically, each switch tongue carries a depending pin or rivet 52 which passes through and is movable in an arcuate slot 54, said slot being cut through the base of the switch section. The lower end of pin or rivet 52 passes through the angle levers, and the latter are preferably longitudinally slotted at 56 in order to accommodate the relative displacement caused by angularity of the parts.

As an exceedingly simple way to connect operating handle 38 with the linkage just described, we form operating handle 38 by prolonging transverse arm 50 until it projects well outside the switch section. Referring to Fig. 4, it will be seen that the operating handle 38 passes through an appropriate slit 58 in the side wall of the switch section, and that the slit 58 is preferably upwardly notched or recessed at 60 in order to normally retain the handle 38 in mid-position. By reference to Fig. 6, it will be observed that operating handle 38 is so shaped or downwardly bent beneath the switch section as to tend normally to rise, thereby bringing it into the locating recess 60 when moved to mid-position. The formation of upwardly bent flanges 62 on the end of handle 38 to facilitate operation thereof, is also clearly brought out in Figs. 3 and 6. The switch tongues 32 and 34 may be constructed in a variety of ways, but as here shown each tongue comprises a bottom plate the sides of which are bent upwardly to form flanges or side walls 64. These side walls are of adequate height to guide the vehicle, and it will be noted that they converge to form a point at one end of the switch tongue, but diverge to provide adequate space for the stationary pivot 36 at the other end of the switch tongue. Moreover, the use of a wide end for the switch tongue has the advantage of providing a more gradual and correct transition from the normal center partition or guide 22 to the switch tongues.

Figure 2:
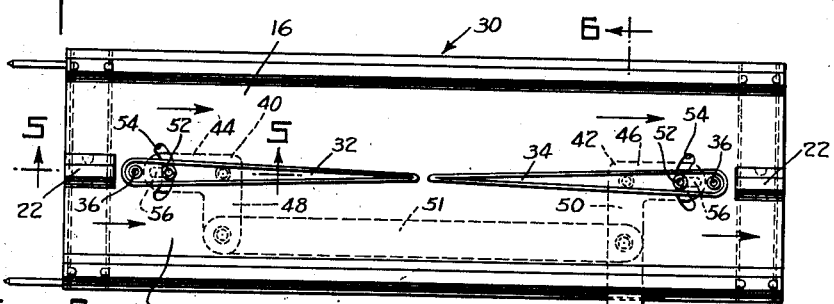
Fig. 2 is a plan view of the switch section of the road.
Figure 3:
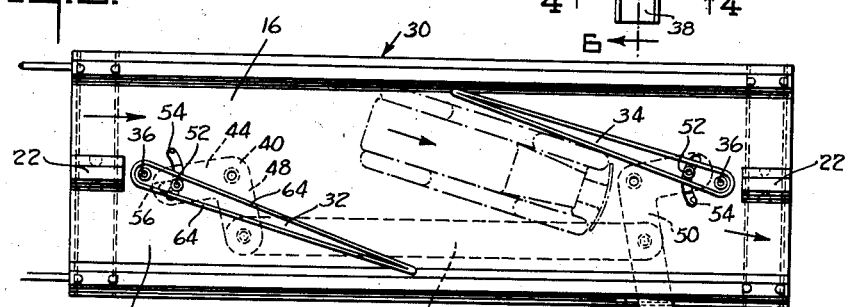
Fig. 3 shows the same with the switch tongues moved to angular position.
Figures 4, 5, 6:
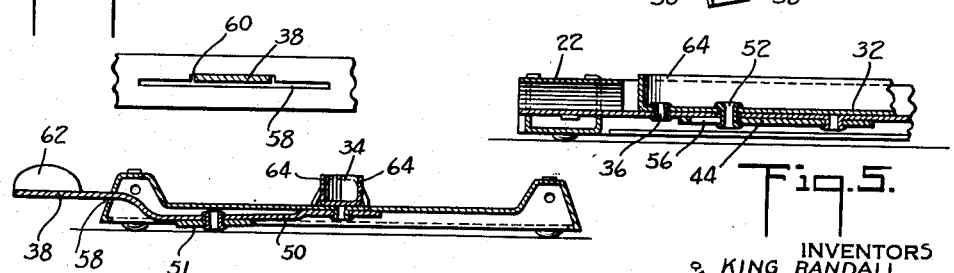
Fig. 4 is an enlarged section taken in the plane of the line 4—4 of Fig. 2.
Fig. 5 is an enlarged section taken in the plane of the line 5—5 of Fig. 2.
Fig. 6 is a transverse section taken in the plane of the line 6—6 of Fig. 2.

By comparing Figs. 2 and 3, it will be apparent that on depressing and swinging the operating handle 38 in one direction, the angle levers are oscillated in a common direction but the longitudinal arms 44 and 46 move toward opposite sides of the road, thereby moving the switch tongues toward opposite sides of the road. The advantage of using two movable tongues as here illustrated is that a vehicle may be guided from the inside track to the outside track, or vice versa, regardless of the direction in which the vehicle is running relative to the switch. For example, a relatively simple switch may be constructed using only a single switch tongue, in this case the tongue 34. Such a tongue may be used to guide a vehicle from either the inside track to the outside track, or vice versa, provided the vehicles are running in the direction indicated in Figs. 1, 2, and 3. If, however, the vehicles are turned around to run clockwise about the roadway shown in Fig. 1, the switch will not function properly. By using two opposed switch tongues, as here illustrated, the switch mechanism is made more nearly universal in its application.

In Fig. 1 the road section preceding the section 30, that is, the road section 70 carries suitable stop mechanism generally designated 72 and operated by a suitable handle 74. This stop mechanism is more clearly shown in Figs. 7 and 8, referring to which it will be seen that the road section 70 is provided with an upright spindle 76 passing through the center partition 22 of the road section. The operating handle 74 is formed in simple fashion by merely bending the lower end of spindle 76 sidewardly. The spindle 76 carries signal vanes 78 and 80 at the upper end thereof, these vanes being disposed at right-angles to one another and carrying the conventional legends "stop" and "go". The "stop" vanes may, of course, be colored red and the "go" vanes green. It will be noted that the arms 82 connecting the "stop" vanes are disposed at a slight downward angle, while the arms 84 connecting the "go" vanes are disposed at a slight upward angle, so that these arms may be axially displaced along spindle 76 while keeping the circular ends thereof at a common elevation.

Spindle 76 further carries vehicle stopping arms 86 near its lower end, these arms being disposed parallel to the stop signal arms 82. The arms 86 are, of course, so located as to obstruct and prevent further movement of the toy vehicles. Manifestly, when the signal is in the position shown in Figs. 7 and 8, the vehicles are stopped, whereas upon swinging the signal through 90° rotation, the "go" signal is presented to the vehicles and at this time the vehicle stopping arms 86 extend parallel to the tracks and lie above partition 22 and safely out of the way of the vehicles. To move the signal from one position to the other, it is merely necessary to move the control handle 74 from notch 88 to notch 90, best shown in Fig. 7, these notches being so spaced as to correspond to an oscillation of handle 74 amounting to 90°. The notches further function, of course, to hold the signal in position.

Reverting now to Fig. 3, it will be seen that after a vehicle has been transferred from the inside track to the outside track, it is necessary to restore the switch tongues to mid-position. This is so because if the switch is left in the position shown in Fig. 3, the vehicle on completing another circuit of the roadway will strike the angularly disposed switch tongue 32 and be stopped thereby or thrown from the road.

Referring now to Figs. 9, 10, and 11, we show a modification of the switch mechanism, in accordance with which the switch tongues are automaticaly restored to mid position by merely releasing the operating lever 38'. For this purpose the switch operating linkage is provided with a pair of springs 92 and 94. In the specific arrangement illustrated in Fig. 11, the outer ends of these springs are connected to the angle levers 40', 42', while the inner ends are connected to the bottom of the switch section, as is indicated at 96 and 98. The springs are equally tensioned when the linkage is in mid-position, and accordingly function to restore the switch tongues to mid-position upon release of the operating handle 38'. With this arrangement it is merely necessary to momentarily displace the operating handle to one side or the other as the vehicle approaches the switch, and to release the handle the moment the vehicle has passed the switch.

If desired, the switch and signal mechanisms may be combined for simultaneous operation. An arrangement of this character is illustrated in Figs. 12, 13, and 14. The switch and signal section is generally designated 100. A preceding section 102 is shown in the drawings, on which a vehicle 104 is illustrated to be approaching the section 100. As before, the partition 106 between the inner and outer tracks is cut away and replaced by oppositely movable switch tongues 108 interconnected by angle levers 110, 112 and a link 114. The mechanism is operated by a handle 116.

The spindle 118 of the signal mechanism is mounted over partition 106 on section 100 near its end. The lower end of spindle 118 is provided with a pinion 120 meshing with a gear sector 122, the said gear sector preferably being formed directly on an extension of angle lever 110. The gear ratio is so selected that the signal is oscillated through 90° when the switch tongue is moved from mid-position to one side, and is oscillated through 180° when the switch tongue is moved all the way from one side to the opposite side. The upper end of spindle 118 is provided with signal discs 124 which are mechanically arranged just as previously described, but only one of which carries a stop designation, the other three discs being marked "go". The lower end of spindle 118 carries a vehicle stopping arm 126, and only one such arm is provided, this being located directly beneath the stop signal 124. In Fig. 12 it will be noted that the vehicle stopping arm 126 is disposed in that track 128 which is blocked by the switch tongue 108. The other track 130 is clear. If the switch tongues are restored to mid-position, then vehicle stopping arm 126 is moved to a position parallel to the tracks, and both tracks are clear. If the switch tongues are swung to opposite angular position, the vehicle stopping arm 126 is moved across track 130, it being that track which would be blocked by the switch tongue.

With the arrangement as so far described, it would be necessary to run the vehicles in the direction indicated in Fig. 12, that is, from left to right. However, the combined switch and signal section is made universal by simply duplicating the signal thus far described at the opposite end of the switch section, thus providing another stop and signal unit generally designated 132. This unit is exactly like that previously described, but the vehicle stopping arm 134 is faced in a direction opposite to that of vehicle stopping arm 126 previously described. The spindle is, of course, operated by a pinion and gear sector, the latter being formed directly on the end of angle lever 112.

On reflection it will be apparent that whenever a vehicle is free to pass, it is given a "go" signal. If a vehicle is being switched from the inner track to the outer track while another vehicle is approaching the switch on the outer track, the latter vehicle is given a "stop" signal and is stopped just before it reaches the switch. If only a single vehicle is being used and this vehicle is switched from one track to the other, the vehicle is automatically stopped after completing another circuit about the roadway, unless the switch is restored to mid-position.

It is believed that the construction and operation as well as the many advantages of our improved switch and signal mechanism will be apparent from the foregoing detailed description thereof. It will also be apparent that while we have shown and described our invention in preferred forms, many changes and modifications may be made in the structures disclosed, without departing from the spirit of the invention, defined in the following claims.

We claim:

1. A toy comprising a plurality of road sections which when assembled form a closed road system including a pair of adjacent parallel tracks for small vehicle toys simulating automobiles or the like, said tracks each being trough-like to guide a vehicle toy therein, and switch mechanism on one of said sections adapted to direct a vehicle from the inside track to the outside track or from the outside track to the inside track, the section including said switch mechanism having the center flange or ridge partially cut away and a movable switch tongue substituted in its stead, a first spring tending to move the switch tongue from one extreme position to mid position, a second spring tending to move the switch tongue from the opposite extreme position to mid position, and means readily accessible at the side of the road for momentarily oscillating said switch tongue from its center position toward either side.

2. A toy comprising a plurality of track sections which when assembled form a closed double track, a plurality of small vehicle toys each simulating an automobile or the like adapted to run in said tracks, said tracks being parallel and including side flanges for guiding the vehicle toys in the tracks, and switch mechanism on one of said sections for switching a toy vehicle moving in either direction from either the inside track to the outside track or vice versa, said section having its center flange or ridge dividing the tracks cut away and a pair of switch tongues substituted in its place, said switch tongues having their points directed toward one another and having their remote ends pivotally mounted on the switch section, linkage so interconnecting said tongues that one is swung inwardly when the other is swung outwardly and vice versa, and operating means accessible at the side of the road for moving said switch tongues from aligned mid position to one side or the other.

3. A switch section for a sectional road for toy automobiles or the like, said switch section comprising a pair of collateral, immediately adjacent tracks, an inner flange for the inner track, an outer flange for the outer track, a switch tongue acting as a guide flange between the inner and outer track, a first spring tending to move the switch tongue from one extreme position to mid position, a second spring tending to move the switch tongue from the opposite extreme position to mid position, and control mechanism at the outside of the switch section for momentarily oscillating said switch tongue in either direction away from mid position.

4. A switch section for a sectional road for toy automobiles or the like, said switch section comprising a pair of collateral, immediately adjacent tracks, an inner flange for the inner track, an outer flange for the outer track, and a pair of aligned movable switch tongues acting as a guide flange between the inner and outer track, the movable ends of said tongues being directed toward one another, the pivoted ends of said tongues being remote from one another, linkage for oscillating one of said tongues toward the inside flange whenever the other tongue is oscillated toward the outside flange and vice versa, and control mechanism at the outside of the switch section for oscillating said switch tongues in either direction away from mid position.

5. A switch section for a sectional road for toy automobiles or the like, said switch section comprising a pair of collateral, parallel immediately adjacent tracks, an inner flange for the inner track, an outer flange for the outer track, and a pair of aligned movable switch tongues acting as a guide flange between the inner and outer track, the movable ends of said tongues being directed toward one another, the pivoted ends of said tongues being remote from one another, linkage for oscillating one of said tongues toward the inside flange whenever the other tongue is oscillated toward the outside flange and vice versa, control mechanism at the outside of the switch section for oscillating said switch tongues in either direction away from mid position, and resilient means for normally moving said control device to mid position.

6. A toy comprising a spring motor driven miniature toy-vehicle simulating an automobile or the like, road sections which when combined form a closed road, said road being trough-shaped to guide the vehicle, a stop-and-go signal, a vehicle stopping arm movable across the road to stop the vehicle against the drive of the spring motor, said vehicle stopping arm being so connected to the signal that the arm is moved across the road when the signal indicates "stop", and control means accessible at the side of the road for changing the indication of said signal and the position of the arm.

7. A toy comprising a spring motor driven miniature toy vehicle simulating an automobile or the like, road sections which when combined form a closed road, said road being sidewardly flanged to guide the vehicle, and a stop-and-go signal comprising an upright signal shaft, stop and go signal vanes mounted at the upper end of said shaft and disposed at right angles to one another, a vehicle stopping arm mounted near the lower end of said shaft and dimensioned to be disposed across the road to stop the vehicle against the drive of the spring motor, said vehicle stopping arm being aligned with the signal arm marked "stop", and means accessible at the side of the road for oscillating said signal.

8. A toy comprising road sections which when assembled form a pair of closed tracks, said tracks being trough-shaped to guide miniature toy vehicles simulating an automobile or the like, and a stop-and-go signal for said road, said signal comprising an upright shaft disposed above the partition between parallel adjacent tracks, signal vanes at the upper end of said shaft carrying suitable stop and go legends, and a stop arm mounted near the bottom of said shaft and adapted to be moved into a track or between the tracks according to whether the vehicle is to be stopped or permitted to pass, said vehicle stopping arm being appropriately related to said signal to stop a vehicle faced by a stop signal.

9. A toy comprising road sections, the roads formed in said road sections being trough-shaped to guide a vehicle toy simulating an automobile or the like, and combined switch and signal mechanism comprising a switch tongue, a stop signal, said stop signal comprising a vertical shaft, signal vanes at the upper end of said shaft with appropriate stop and go legends, a vehicle stopping arm near the bottom of said shaft movable into one of the roads, operating means, and means so interconnecting said operating means, said switch and said signal, that the signal indicates "go" for a vehicle to which the switch is open, but indicates "stop" and acts to stop a vehicle against which the switch is closed.

10. A toy comprising road sections forming a pair of closed tracks, said tracks being trough-shaped to guide vehicle toys simulating an automobile or the like, and combined switch and signal mechanism comprising adjacent tracks, the center flange or ridge between which is interrupted and replaced by a switch tongue movable to either side of center, a stop signal comprising a vertical shaft disposed between the tracks, signal vanes at the upper end of said saft with appropriate stop and go legends, a vehicle stopping arm near the bottom of said shaft movable into a track, operating means, and means so interconnecting said operating means, said switch and said signal, that the signal indicates "go" for a vehicle to which the switch is open, but indicates "stop" and acts to stop a vehicle against which the switch is closed.

11. A toy comprising road sections forming a pair of closed tracks, said tracks being trough-shaped to guide vehicle toys simulating an automobile or the like, and combined switch and signal mechanism comprising adjacent tracks, the center flange or ridge between which is interrupted and replaced by a pair of switch tongues, the movable switch tongues being directed toward one another and the pivoted ends being remote from one another, linkage so connecting said tongues that one is moved inwardly when the other is moved outwardly and vice versa, a stop signal comprising a vertical shaft disposed between the tracks, signal vanes at the upper end of said shaft with appropriate stop and go legends, a vehicle stopping arm near the bottom of said shaft movable into a track, operating means, and means so interconnecting said operating means, said switch and said signal, that the signal indicates "go" for a vehicle to which the switch is open, but indicates "stop" and acts to stop a vehicle against which the switch is closed.

12. In a toy automobile road system, a road section including a main piece of sheet metal bent upwardly at one edge to form an inside flange for an inside track and at its opposite edge to form an outside flange for an outside track, a switch tongue disposed at the center of said section forming a partition between the inside and outside tracks, an angle lever pivoted beneath said road section, one arm of said lever being connected to the switch tongue by appropriate pin and slot connection in order to oscillate the tongue, the transverse arm being elongated and projecting from the side of the section to act as a control lever for the switch mechanism.

13. In a toy automobile road system, a road section including a main piece of sheet metal bent upwardly at one edge to form an inside flange for an inside track and at its opposite edge to form an outside flange for an outside track, a switch tongue disposed at the center of said section forming a partition between the inside and outside tracks, an angle lever pivoted beneath said road section, one arm of said lever being connected to the switch tongue by an appropriate pin and slot connection in order to oscillate the tongue, the transverse arm being elongated and projecting from the side of the section to act as a control lever for the switch mechanism, the longitudinally directed arm being provided with a gear sector, a stop-and-go signal having a vertical shaft projecting upwardly from said section, a pinion on said shaft meshing with the transverse gear sector, and appropriate stop and go and vehicle stopping arms mounted on said signal shaft.

14. In a toy automobile road system, a road section including a main piece of sheet metal bent upwardly at one edge to form an inside flange for an inside track and at its opposite edge to form an outside flange for an outside track, a pair of switch tongues disposed end to end at the center of said section forming a partition between the inside and outside tracks, angle levers pivoted beneath said road section and having longitudinally directed arms pointed in opposite direction and transverse arms pointed in a common direction, the oppositely pointed arms of said levers being connected to the switch tongues by appropriate pin and slot connections in order to oscillate the tongues in opposite direction upon movement of the transverse arms of said angle levers in a common direction, a link connecting said transverse arms for simultaneous movement, one of said transverse arms being elongated and projecting from the side of the section to act as a control lever for the switch mechanism.

15. In a toy automobile road system, a road section including a main piece of sheet metal bent upwardly at one edge to form an inside flange for an inside track and at its opposite edge to form an outside flange for an outside track, a pair of switch tongues disposed end to end at the center of said section forming a partition between the inside and outside tracks, angle levers pivoted beneath said road section and having longitudinally directed arms pointed in opposite direction and transverse arms pointed in a common direction, the oppositely pointed arms of said levers being connected to the switch tongues by appropriate pin and slot connections in order to oscillate the tongues in opposite direction upon movement of the transverse arms of said angle levers in a common direction, a link connecting said transverse arms for simultaneous movement, one of said transverse arms being elongated and projecting from the side of the section to act as a control lever for the switch mechanism, a longitudinally directed arm being provided with a gear sector, a stop-and-go signal having a vertical shaft projecting upwardly from said section near one end thereof, a pinion on said shaft meshing with the gear sector, and appropriate stop and go vanes and vehicle stopping arms mounted on said signal shaft, the gear sector and pinion being so related that the signal indicates "stop" to that side of the road which is blocked by the switch, and "go" to that side of the road which is open.

16. A toy traffic signal comprising an upright spindle, a pair of diametrically oppositely directed arms secured to said spindle and enlarged at their ends to form signal-bearing surfaces, another pair of diametrically oppositely directed arms secured to said spindle transversely of the aforesaid arms and also enlarged at their ends to form signal-bearing surfaces, the arms of the first pair being upwardly directed toward the spindle and the arms of the second pair being downwardly directed toward the spindle, whereby the arms are axially displaced from one another at their point of attachment to the spindle, while the enlarged signal-bearing surfaces are all at a common elevation.

17. A toy automobile road system comprising a switch section and a plurality of road sections with means for detachably connecting the same end to end to form a pair of closed tracks, each section including a piece of sheet metal reversely bent upwardly at one edge to form an inside flange for an inside track, and reversely bent upwardly at its opposite edge to form an outside flange for an outside track, the road sections also being reversely bent upwardly at the center to form a partition between the inside and outside tracks, said switch section having a switch tongue disposed at the center to act as a partition between the inside and outside tracks, said switch tongue being formed of sheet metal pointed at one end and diverging to a width at its opposite end approximating the width of the partition of the other sections, the sides of said switch tongue being flanged to give the same a height approximating that of the partition, the wide end of the switch tongue being pivotally mounted on top of the switch section, an angle lever pivotally mounted beneath the switch section, one arm of said lever being connected to the switch tongue by a pin and slot connection, and the other arm of said lever projecting from the side of the switch section and acting as a control for oscillating the switch tongue to one side or the other of its center position.

18. A toy comprising a plurality of road sections which when assembled form a closed double track, a plurality of small vehicle toys each simulating an automobile or the like adapted to run in said tracks, said tracks being trough-like for guiding the vehicle toys in the tracks, and switch mechanism for switching a toy vehicle moving in either direction from either the inside track to the outside track or vice versa, the section having said switch mechanism being so arranged between the two tracks as to permit passage of the vehicle toys from either track to the other, said switch mechanism comprising a pair of switch tongues mounted between the two tracks and having their points directed toward one another in alignment and having their remote ends pivotally mounted between the inside and outside tracks, linkage so interconnecting said tongues that one is swung inwardly when the other is swung outwardly and vice versa, and operating means accessible at the side of the road for moving said switch tongues from aligned mid position to one side or the other.

KING RANDALL.
MYRON FLEISHMAN.